Sept. 6, 1927.

R. E. KOLBE

FREEZING METHOD

Filed June 9, 1925

1,641,441

INVENTOR.
Robert E. Kolbe
BY
ATTORNEYS.

Patented Sept. 6, 1927.

1,641,441

UNITED STATES PATENT OFFICE.

ROBERT E. KOLBE, OF ERIE, PENNSYLVANIA.

FREEZING METHOD.

Application filed June 9, 1925. Serial No. 35,897.

In treating materials to condition them, such as in the freezing of fish, it is desirable to accomplish the purpose in a continuous operation. The present invention is designed to accomplish this in a simple and efficient manner and in carrying out the invention a liquid having the temperature desired is moved through a container preferably in a circuitous path and carries with it receptacles which float upon the liquid and carry the material which is to be treated. As ordinarily practiced the liquid is moved at a velocity which with relation to the path of the liquid is such as to maintain the receptacles as they move with the liquid a sufficient time to accomplish the desired heat transference. However, this may be controlled, if desired, by timing the discharge and permitting the receptacles to bank up in the apparatus. Other features and details of the invention will appear from the specification and claims.

The apparatus for carrying out the invention is illustrated in the accompanying drawings as follows:—

Figure 1:
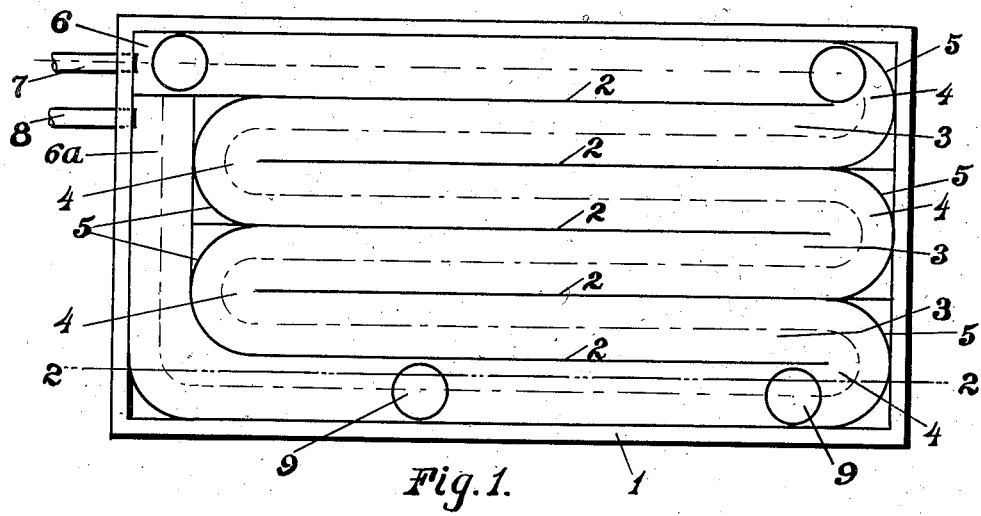

Fig. 1 shows a plan view of the device, the cover being removed to better show construction.

Figure 2:
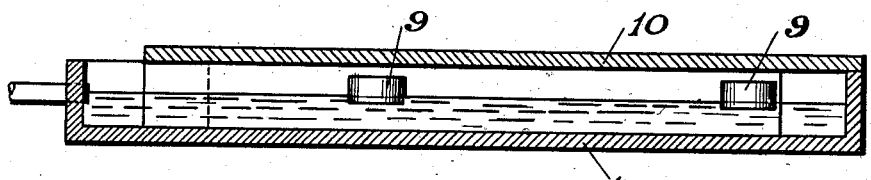

Fig. 2 a section on the line 2—2 in Fig. 1.

Figure 3:
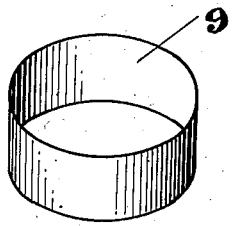

Fig. 3 a perspective view of one of the material carrying receptacles.

Figure 4:
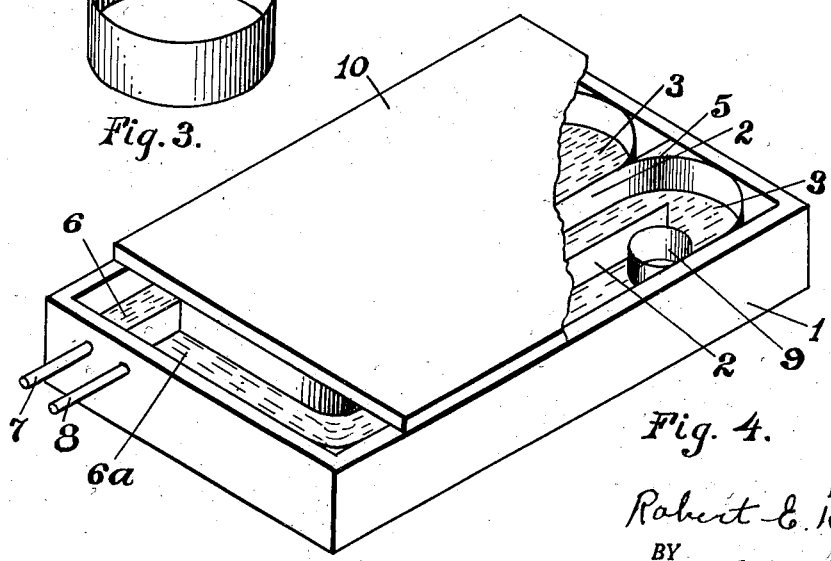

Fig. 4 a perspective view of the device, partly broken away.

1 marks the container, ordinarily a shallow tank. This has a series of partitions 2 forming paths 3, the partitions being open alternately at their ends forming turns 4. The outer ends of the turns 4 have a rounded guiding wall 5. The inlet end of the circuitous path is extended to the end of the container forming a point of loading 6 and a discharge end 6ª is preferably carried to a point adjacent to the loading end so that the apparatus may be operated from one position.

A liquid having the temperature desired, in the specific exemplification of the invention ordinarily brine, is delivered through a pipe 7 and discharged through an overflow 8 maintaining a comparatively constant level through the apparatus.

Receptacles 9, preferably round so as to more readily make the corners, are provided, being of sufficient depth to give a desired buoyancy to carry the material loaded into them. In the specific exemplification of the invention these are ordinarily loaded with fish and are started in the receptacle at the point 6. As the liquid flows the receptacles are carried along the paths through the apparatus finally reaching the discharge position 6ª where they are removed. The length of the circuit as compared with the velocity of the liquid is so related that the proper heat transference will take place in the time necessary to pass the receptacles through the apparatus. If, however, this is not sufficient the receptacles may be blocked at the outlet and allowed to remain in the apparatus the required length of time. While the apparatus may be operated in an open position it is desirable to cover the container and a cover 10 covers the entire container.

What I claim as new is:—

1. The method of freezing materials which consists in establishing a moving liquid having a freezing point below that of the material to be frozen and having a temperature below the freezing point of the material to be frozen, arranging the material to be treated in buoyant receptacles and subjecting the receptacles to movement through the flow of the liquid and to the temperature of the liquid as it is moved.

2. The method of freezing materials which consists in establishing a liquid having a freezing point below that of the material to be frozen and with a movement from a desired loading point to a discharge point, said liquid having a temperature below the freezing point of the material to be frozen, arranging the material to be treated in buoyant receptacles and subjecting the receptacles to movement through the flow of the liquid and to the temperature of the liquid as it is moved.

3. The method of freezing materials which consists in establishing a moving liquid having a freezing point below that of the material to be frozen and having a temperature below the freezing point of the material to be frozen, arranging the material to be treated in buoyant receptacles, subjecting the receptacles to movement through the flow of the liquid and to the temperature of the liquid as it is moved, and controlling the speed of the liquid in relation to the distance traversed by the receptacle to produce the desired freezing action.

In testimony whereof I have hereunto set my hand.

ROBERT E. KOLBE.